US009242696B2

(12) United States Patent
Scolari et al.

(10) Patent No.: US 9,242,696 B2
(45) Date of Patent: Jan. 26, 2016

(54) SCOOTER HAVING A VARIABLE SPEED CAM DRIVE SYSTEM

(71) Applicant: Zike, LLC, Greenville, SC (US)

(72) Inventors: Nathan A. Scolari, Greenville, SC (US); George Reiter, Taylors, SC (US)

(73) Assignee: Zike, LLC, Greenville, SC (US)

( * ) Notice: Subject to any disclaimer, the term of this patent is extended or adjusted under 35 U.S.C. 154(b) by 38 days.

(21) Appl. No.: 14/204,287

(22) Filed: Mar. 11, 2014

(65) Prior Publication Data
US 2014/0265210 A1    Sep. 18, 2014

Related U.S. Application Data

(60) Provisional application No. 61/787,133, filed on Mar. 15, 2013.

(51) Int. Cl.
| | |
|---|---|
| B62M 1/24 | (2013.01) |
| B62M 1/28 | (2013.01) |
| B62M 1/30 | (2013.01) |
| B62M 9/04 | (2006.01) |
| B62M 9/06 | (2006.01) |
| B62M 11/04 | (2006.01) |
| B62K 3/00 | (2006.01) |

(52) U.S. Cl.
CPC .................. B62M 1/24 (2013.01); B62K 3/002 (2013.01); B62M 1/28 (2013.01); B62M 1/30 (2013.01); B62M 9/04 (2013.01); B62M 9/06 (2013.01); B62M 11/04 (2013.01)

(58) Field of Classification Search
CPC ............ B62M 1/24; B62M 1/28; B62M 1/30; B62M 9/04; B62M 11/04; B62K 3/002
See application file for complete search history.

(56) References Cited

U.S. PATENT DOCUMENTS

| 1,798,971 | A | * | 3/1931 | Clements | ...................... | 280/215 |
| 2,251,005 | A | * | 7/1941 | Rubinich | ...................... | 280/258 |

(Continued)

FOREIGN PATENT DOCUMENTS

| CH | 227908 | * | 7/1943 | ............... | B62M 1/24 |
| DE | 2655700 | * | 6/1978 | ............... | B62M 1/24 |

(Continued)

OTHER PUBLICATIONS

International Search Report and Written Opinion of the International Searching Authority for PCT/US2014/028791.

*Primary Examiner* — Joseph Rocca
*Assistant Examiner* — Maurice Williams
(74) *Attorney, Agent, or Firm* — McNair Law Firm, P.A.; Douglas W. Kim (57) ABSTRACT

This invention is directed to a variable speed drive system comprising: a frame having front and rear wheels; reciprocating pedals rotatably attached to the frame for supporting the rider; a pedal cam attached to one of the pedals at a hub where a distance between the hub and a first sprocket of the pedal cam is less than a distance between the hub and a second sprocket of the pedal cam; a coupling cam attached at a front axle and operably connected to the pedal cam so that when the pedal cam rotates when force is exerted downward on the pedal, the coupling cam rotates in an opposite direction from the pedal cam; and a drive sprocket carried by the coupling cam and linked to a wheel sprocket by a drive chain so that when the coupling cam rotates, the drive sprocket rotates causing the rear wheel to rotate.

16 Claims, 8 Drawing Sheets

(56) References Cited

U.S. PATENT DOCUMENTS

| | | | |
|---|---|---|---|
| 3,083,985 A * | 4/1963 | Young | 280/258 |
| 3,375,023 A | 3/1968 | Cox | |
| 4,019,230 A * | 4/1977 | Pollard | 280/214 |
| 4,133,550 A | 1/1979 | Brown | |
| 4,473,236 A * | 9/1984 | Stroud | 280/258 |
| 4,945,802 A | 8/1990 | Ruprecht | |
| 5,335,927 A * | 8/1994 | Islas | 280/255 |
| 5,520,401 A * | 5/1996 | Mohseni | 280/221 |
| 5,836,855 A * | 11/1998 | Eschenbach | 482/57 |
| 6,857,648 B2 * | 2/2005 | Mehmet | 280/217 |
| 7,988,170 B1 * | 8/2011 | Fan | 280/221 |
| 8,128,111 B2 | 3/2012 | Scolari et al. | |
| 8,944,452 B1 * | 2/2015 | Scolari et al. | 280/221 |
| 2002/0173409 A1 * | 11/2002 | Bhoopathy | 482/57 |
| 2003/0173755 A1 * | 9/2003 | Lachenmayer | 280/252 |
| 2006/0183580 A1 * | 8/2006 | Seol | 474/1 |
| 2008/0146390 A1 * | 6/2008 | Lacreu | 474/68 |
| 2009/0066053 A1 * | 3/2009 | Yan | 280/252 |
| 2009/0134597 A1 | 5/2009 | Buchberger et al. | |
| 2011/0057412 A1 * | 3/2011 | Owoc et al. | 280/257 |
| 2011/0224047 A1 * | 9/2011 | Sans | 482/51 |
| 2012/0061942 A1 * | 3/2012 | Kulikov et al. | 280/287 |
| 2013/0168942 A1 * | 7/2013 | Musgrove | 280/210 |
| 2014/0265212 A1 * | 9/2014 | Scolari et al. | 280/253 |

FOREIGN PATENT DOCUMENTS

| | | | | |
|---|---|---|---|---|
| DE | 19852153 A1 | * | 5/2000 | B62M 1/00 |
| DE | 10119495 A1 | * | 11/2002 | B62M 1/04 |
| EP | 2679480 A1 | | 1/2014 | |
| FR | 631286 | * | 12/1927 | B62K 3/002 |
| FR | 631872 | * | 12/1927 | B62M 1/28 |
| FR | 634570 | * | 2/1928 | B62K 3/002 |
| FR | 931729 | * | 3/1948 | B62M 1/30 |
| WO | WO 9528315 A1 | * | 10/1995 | |
| WO | WO 0024630 A1 | * | 5/2000 | |
| WO | WO 03008261 A1 | * | 1/2003 | |
| WO | WO 2013172735 A1 | * | 11/2013 | |

\* cited by examiner

SCOOTER HAVING A VARIABLE SPEED CAM DRIVE SYSTEM

BACKGROUND OF THE INVENTION

1) Field of the Invention

This invention is directed to a rider propelled scooter that uses a pair of reciprocating foot pedals for propulsion. More particularly, this invention relates to a new variable speed cam drive system.

2) Description of Related Art

A rider powered scooter as is generally understood is typically a two wheeled vehicle with a front free rolling, steerable wheel and a rear free rolling, non-steerable wheel connected to each other by a frame including a rider platform positioned between the wheels on which the rider can support himself. To move, the rider can roll or coast downhill and on level or elevated ground or can use one foot to push off the ground as the other foot rests on the platform. To start rolling, the rider often runs alongside the scooter to reach speed and jumps onto the platform to ride using the one foot push method to maintain motion. These simple coaster type scooters had gained popularity among young riders as they were generally easy to ride and required less skill to ride than a skateboard device which has no true steering mechanism other than weight shifting which required rider skill, balance and agility to steer the device. Both the scooter and the skateboard's use of very small wheels permitted the platforms to be very low relative to the ground. This improved the stability of these free rolling scooters. Scooters have no easy way to maintain speed and are somewhat limited in performance. Unlike skateboards which could be used in a variety of exciting ways including jumps and wheelies and other tricks, these coaster scooters simply are more limited and shortly after the excitement of the initial purchase, the child simply got bored or tired of the device. The scooter simply was not as much fun as a skateboard and could not compete with a bicycle in terms of performance, so the device was relegated to a fad which over time may lose children's interest.

When propelling the scooter, United State Patent Application Publication 2011/0057411, an application by the same inventor as herein, shows a scooter with reciprocating pedals to propel the scooter. When riding a scooter, it would be advantageous to be able to vary the force transferred to the drive wheel cased upon where the pedal was in its stroke. For example, as the pedal moves downward, more force can be generated as once the pedal in moving inertia has been overcome and more force can be generated. Therefore, it would be advantageous to have a system with variable speeds resulting in varied force being applied to the drive wheel of the scooter.

Further, it would be advantageous to have an ability to vary the pedal stroke based upon the physical dimensions of the rider. For example, the taller the rider or the stronger the rider, the longer the pedal stroke can be. Once a rider becomes experienced with the scooter or other rider powered vehicle, the rider may wish for a longer pedal stroke given the increased experience and skill developed by the rider. Traditionally, the rider would have to purchase or otherwise acquire another model with a different pedal stroke. This option is cumbersome and expensive resulting in the rider having to purchase or acquire multiple vehicles.

Therefore, it is an object of the present invention to provide for a variable speed system to allow for varied force to be applied to the drive wheel depending upon the location of the pedal in the pedal stroke.

It is another object of the present invention to provide for a variable pedal stroke so that the pedal stroke can be adjusted according to the desires of the rider.

SUMMARY OF THE INVENTION

The objectives of this invention are accomplished by providing a variable speed drive system for a rider powered personal vehicle comprising: a frame having a front wheel, a rear wheel and reciprocating pedals; a left and right pedal cam carried by the frame and operatively connected to a left and right coupling cam respectively; a drive chain connected to at least one coupling cam and the rear wheel so that when the coupling cam rotates, force is transferred to the rear wheel causing it to rotate; a teeter assembly attached between the pedals having a variable length bridge so that the pedal stroke can be varied with the length of the bridge allowing the rider to adjust the maximum height of the pedal at the top of the stroke.

The invention can include a cam chain connecting the pedal cam to the coupling cam. A pedal cam distance can be defined between a hub of the pedal cam and the point where it contacts the coupling cam and a coupling cam distance can be defined between a axis of the coupling cam and the point where it contacts the pedal cam wherein the ratio between the pedal cam distance and the coupling cam distance is reduced as the pedal cam rotates. The bridge can include a pair of radiused plates that can be arranged to vary the length of the bridge.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 4E shows a perspective view of the teeter system in accordance with an embodiment of the invention; and, FIG. 4F shows a top plan view of the teeter system in accordance with an embodiment of the invention.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

Figure 1:
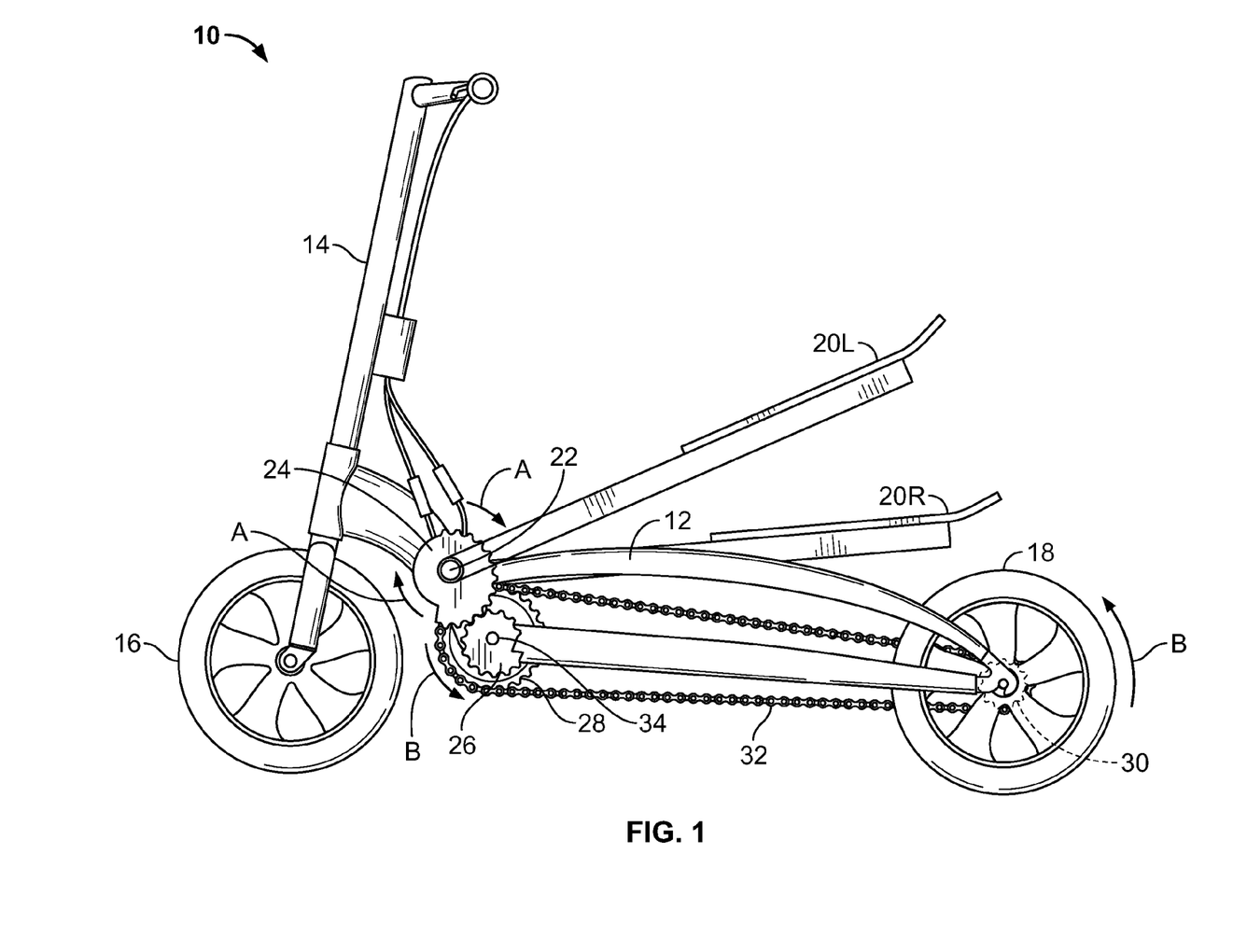
FIG. 1 shows a perspective view of the invention in accordance with an embodiment of the invention.

With reference to the drawings, the invention will now be described in more detail. Referring now to FIG. 1, a scooter 10 has a frame 12 that includes a steerable handle bar assembly 14, which secures the front wheel 16 so that the user may steer the scooter. The scooter further includes a rear wheel 18 to the frame 12. The scooter includes two foot pedals 20R and 20L, which are pivotally connected to the frame by means of a hub 22. While the left pedal is not shown in FIG. 1, the pedals mirror one another and operate in a reciprocating motion, moving up and down.

As can be seen, the scooter further includes a cam assembly, which comprises a pedal cam 24 and a coupling cam 26. While not shown, the scooter includes two cam assemblies on each side of the scooter that mirror one another. In the shown embodiment, the left side of the scooter further includes a drive sprocket 28 that is operably connected to a wheel sprocket 30 by a drive chain 32. In both cam assemblies, the pedal cam is rotatably connected to the hub 22 and driven by one of the respective foot pedals. In the shown embodiment, only the left cam drive sprocket is located on the left side of the scooter and is rotatably connected to the frame by a front axle 34. As discussed more fully below, the coupling cam 26 from both cam assemblies rotates the axle during a down stroke of the respective foot pedals, thus, causing the drive sprocket 28 to rotate the wheel sprocket 30 and propel the scooter forward.

The pedal 20L drives the pedal cam 24 such that on a downward stroke, the pedal causes the pedal cam to rotate in direction A. The pedal cam simultaneously causes the coupling cam 26, and thus, the drive sprocket 28 to rotate in direction B, thus causing the wheel to turn in direction B. While not shown, the scooter further includes a spring loaded, one way clutch that is disposed on the axle 34 so that when the pedal 20L is in an upstroke and the directions of the pedal cam 24 and the coupling cam 26 are reversed, the clutch spins freely while the axle 34 is rotated by the opposite pedal. Consequently, the axle only rotates in direction B and only in response to the down stroke of either of the foot pedals. The axle's rotation is completely unaffected by the upstroke of either foot pedal.

Figure 2:
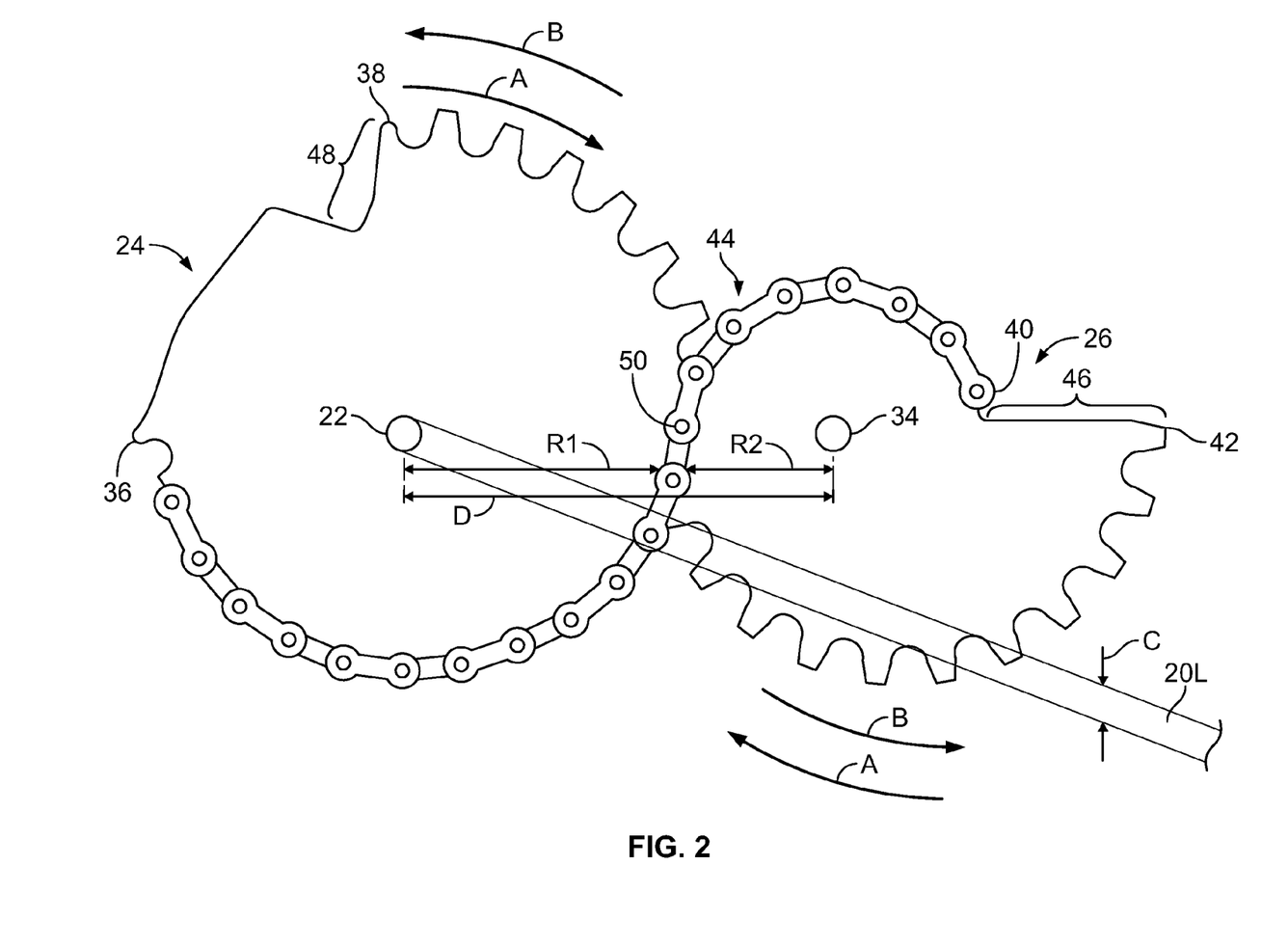
FIG. 2 shows a side elevation view of the pedal cam and coupling cam in accordance with an embodiment of the present invention.

Referring now to FIG. 2 the cam assembly, which comprises the pedal cam 24, which is rotatably mounted on hub 22 and the coupling cam 26, which is rotatably mounted on front axle 34, can be seen more clearly. As discussed above, the scooter includes two cam assemblies, one of which is driven by the left foot pedal 20L and one which is driven by the right foot pedal 20R. The structure and operation of both cam systems is identical. Accordingly, only one cam system will be discussed.

Both the pedal cam 24 and the coupling cam 26 have sprocket teeth disposed along less than 360 degrees around their circumference up to many times their circumference. Additionally, pedal cam and coupling cam have the same number of sprocket teeth disposed around their perimeter to ensure that they can engage the chain 44 throughout their rotation. Moreover, the pedal cam 24 has an aspheric radius such that when moving in direction A, the radius, as measured from the hub 22 decreases. In one embodiment, the distance between hub 22 and first sprocket 36 is half the distance between hub 22 and last sprocket 38.

In the shown embodiment, coupling cam 26 has sprocket teeth disposed around the entire circumference of the cam. However, first sprocket tooth 40 and last sprocket tooth 42 are laterally spaced from one another.

Pedal cam 24 and coupling cam 26 are operatively connected to one another by a cam chain 44 or gear teeth. In the shown embodiment, one end of the cam chain is connected to the first full sprocket tooth 36 of the pedal cam and the other end of the cam chain is connected to the first sprocket tooth 40 of the coupling cam. As foot pedal 20L engages in a downward stroke (direction C) the pedal cam 24 is caused to rotate in direction A. Thus, the cam chain causes coupling cam 26 to rotate in direction B. The cams have the ability to rotate in their respective directions until the pedal cam has rotated 360 degrees thus causing the coupling cam lip 46 of pedal cam to engage the pedal cam lip 48 of the pedal cam at the point of contact 50. Alternatively, the cams can rotate in the opposite direction until the first sprocket 40 of the coupling cam engages the last sprocket tooth 38 of the pedal cam at the point of contact 50.

When the cams rotate with respect to one another the distance D between the hub 22 and the axle 34 remains constant. However, because each of the cams has an aspheric curvature caused by the change in the radius as measured from the hub and axle respectively, the ratio between R1 and R2 changes. This change in the ratio of R1 and R2 as the cams rotate causes there to be a difference in the rotational power output of the coupling cam depending on what portion of the cams engage at the point of contact 50. In at least one embodiment, when the first sprocket tooth 36 of the pedal cam is engaging the last tooth 42 of the coupling cam at the point of contact 50, the ratio of R1/R2 is 1:1. Thus, a rotation of the pedal cam by 30 degrees will cause a rotation of the coupling cam by 30 degrees, which will in turn cause the drive sprocket (28 in FIG. 1) and thus the wheel (18 in FIG. 1) to rotate by 30 degrees.

If, however, the last sprocket tooth 38 of the pedal cam is engaging the first sprocket tooth 40 of the coupling cam at the point of contact 50, the ratio of R1/R2 is 3:1. In this instance, a rotation of the pedal cam 24 by 30 degrees will cause a rotation of the coupling cam 26 by 90 degrees, which will in turn cause the drive sprocket (28 in FIG. 1) and thus the wheel (18 in FIG. 1) to rotate by 90 degrees in direction B, thus propelling the scooter forward. As will be discussed more fully below the user can vary the rotational output of the coupling cam 26 and thus the speed of the scooter by controlling which sections of the pedal cam and the coupling cam engage at the point of contact during a down stroke of a foot pedal.

As discussed above, when foot pedal 20L is engaged in an upstroke in the direction opposite of direction C, the pedal cam 24 will rotate in direction B while the coupling cam 26 will rotate in direction A. The scooter includes a clutch operatively associated with the coupling cam 26 and the drive sprocket (34 in FIG. 1) so that the rotation of the coupling cam simultaneously rotates the front axle 34 and drive sprocket in direction B when the foot pedal 20L is in a down stroke but allows the coupling cam 26 to rotate freely with no affect on the axle or drive sprocket when the coupling cam is rotating in direction A. Consequently, the upstroke of the foot pedal 20L has no affect on the rotation of the drive sprocket or the rear wheel.

Figure 3:
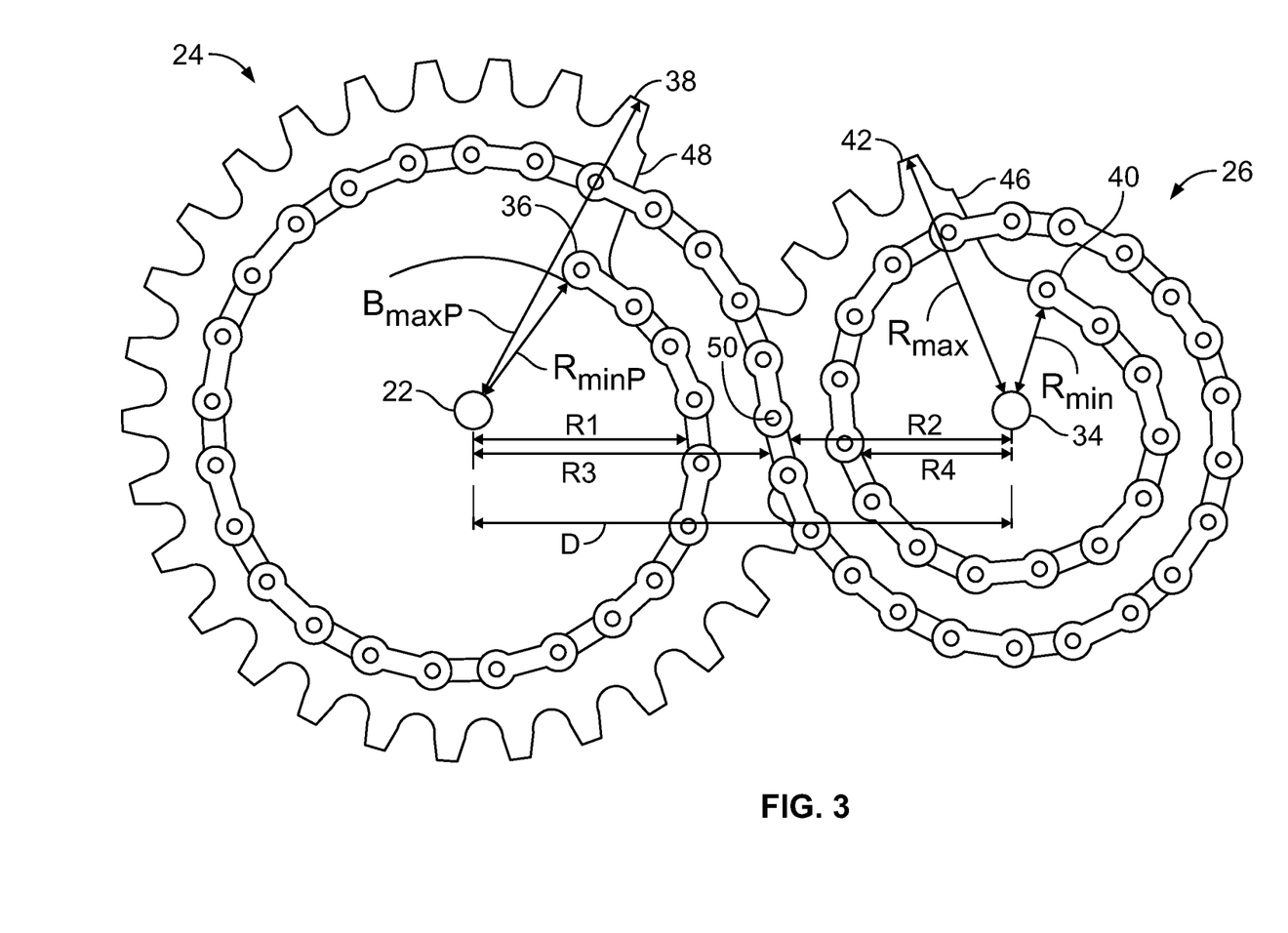
FIG. 3 shows a side elevation view of the pedal cam and coupling cam in accordance with an embodiment of the present invention.

Referring now to FIG. 3, an alternate arrangement for the cam assembly may be seen. The pedal cam 24 has sprocket teeth that extend around the entire circumference of the cam in a helical fashion such that the first sprocket tooth 36 of the pedal cam has the smallest radius $R_{min}$ from the hub 22 and the least lateral distance from the frame of the scooter while the last sprocket tooth 38 has the greatest radius $R_{max}$ from the hub and the greatest lateral distance from the frame. Thus, the pedal cam 24 has a conical shape where the narrowest part of the cone faces towards the frame. In this embodiment, pedal cam 24 has sprocket teeth around its entire periphery so that the coupling cam becomes a continuous side to side spiral nest.

The coupling cam 26 has sprocket teeth around the circumference of the coupling cam creating a generally conical shape that faces in the opposite direction of the pedal cam so that the widest part of the cone faces the frame. The last sprocket 42 has the greatest radius from the axle 34 and has the least lateral distance from the frame. The first sprocket 40 has the smallest radius from the axle $R_{min}$ and has the greatest lateral distance from the frame.

This embodiment allows the pedal cam 24 to rotate 360 degrees, thus allowing the coupling cam to maximize its rotation (with the angle or rotation depending directly on the rate of change of the coupling cam's radius. This also allows the ratio between R1 and R2 to vary from 1:1 up to a maximum ratio. Thus, this embodiment also allows the user to further vary the rotational power output of the coupling cam by increasing the ratio from R1 and R2 to the ratio of R3 and R4.

Figure 4A:
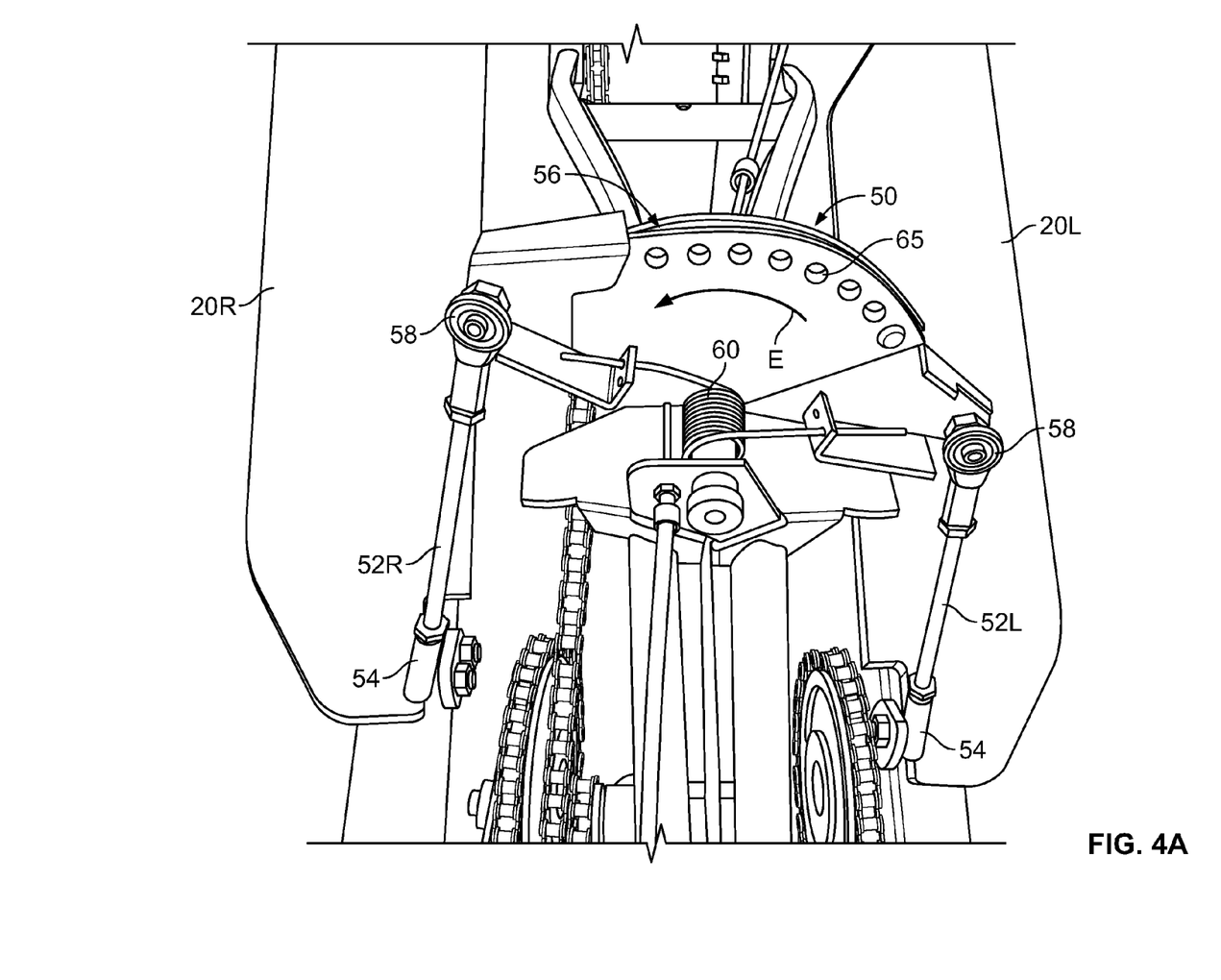
FIGS. 4A & 4B show a perspective view of the teeter system in accordance with an embodiment of the invention.
Figure 4B:
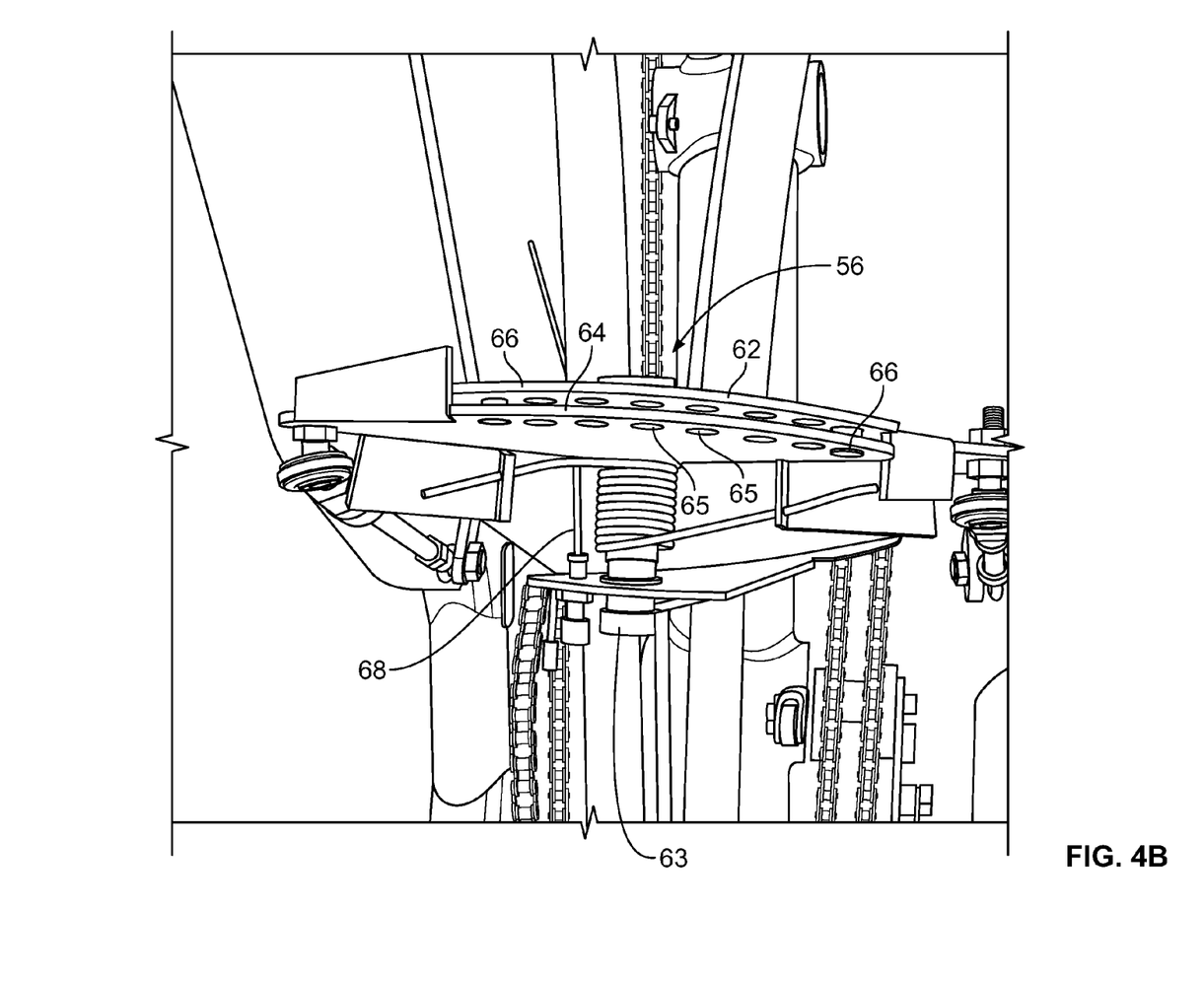

Referring now to FIGS. 4A & 4B, a teeter assembly that ensures that the foot pedals work in a synchronized manner while allowing the position of the foot pedals to be altered as shown. The teeter assembly generally shown as 50 has a first arm 52L and a second arm 52R, each of which has a lower end that is pivotally connected to the foot pedals 20L and 20R at 54. Each arm further includes an upper end that is pivotally connected to a teetering member or bridge 56 at connection 58. In one embodiment, connection points 54 & 58 are ball joints. In alternate embodiments, the connection points may use any means generally known in the art, such as bearings.

As the right foot pedal 20R engages in an downward stroke, teetering member 56 will rotate counterclockwise in direction E. Because the teetering member is pivotally connected to the left foot pedal, the left arm 52L will ensure that the left foot pedal engages in an upward stroke at the same rate at which the right foot pedal engages in a downward stroke. Because the foot pedals are moving in a direction that is perpendicular to the teetering member 56 the upper pivotal connections 58 pivot in a direction that is perpendicular to the lower pivotal connection points 54.

Figure 4C:
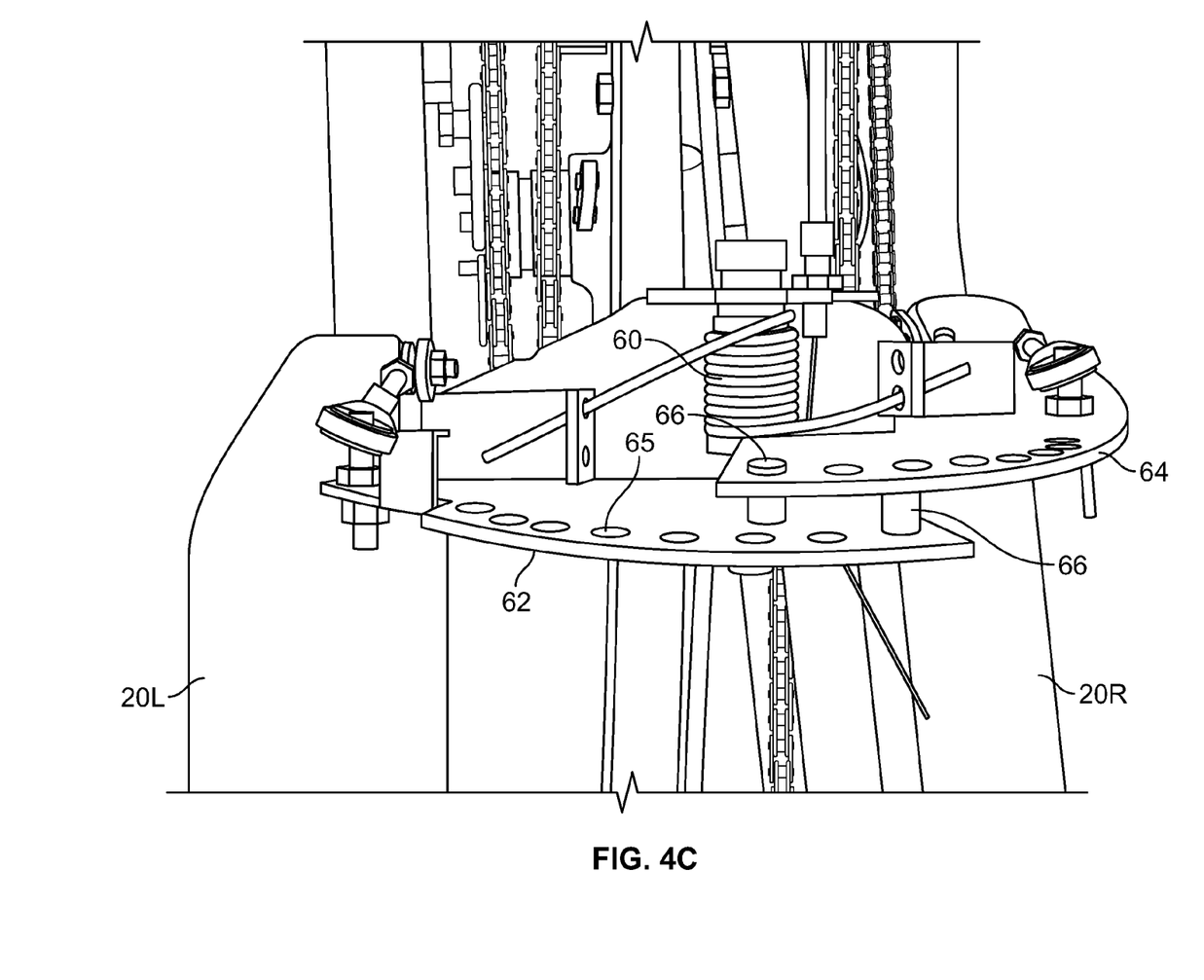
FIG. 4C shows a top plan view of the teeter system in accordance with an embodiment of the invention.
Figure 4D:
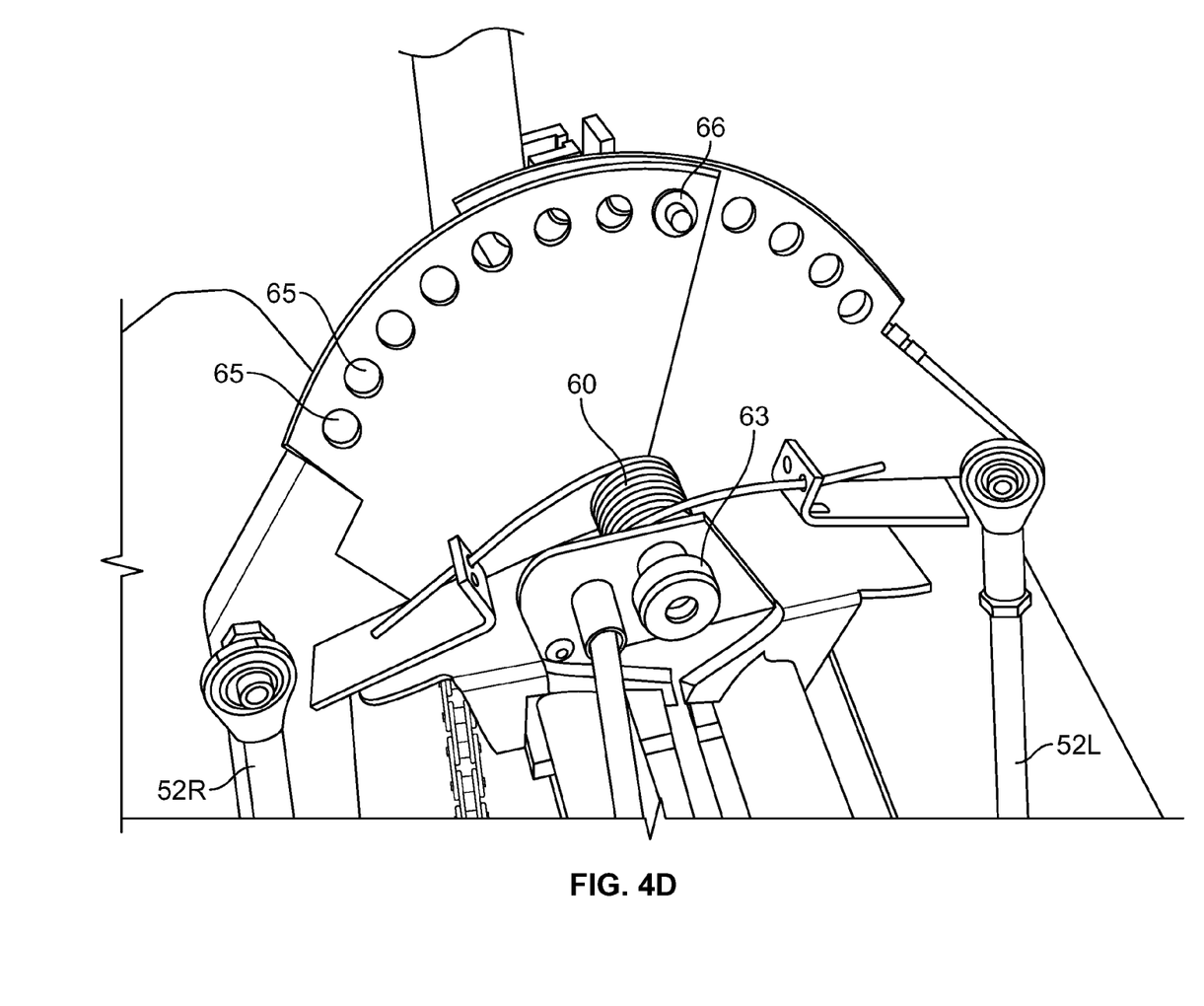
FIG. 4D shows a side elevation view of the teeter system in accordance with an embodiment of the invention.

Referring now to FIGS. 4A-4D, teetering member includes two adjustment member that are included in the bridge. In one embodiment, there are two radiused plates, a first radiused plate 62 and a second radiused plate 64, each of which have a plurality of openings 65 that align with one another when in a resting position (as shown in FIG. 4A-4B). The radiused plates are rotatably mounted on teeter shaft 63. Each of the radius further includes two pins 66 that are permanently disposed through one of the openings in each of the radiused plates. Pins 66 are designed to be received by the radiused plate openings 65 disposed on the opposite radiused plate. In at least one embodiment, pins are disposed in the outermost openings as can be seen in FIGS. 4C & 4D. When the radiused plates are immediately adjacent to one another (as shown in FIGS. 4A-4B), these pins hold the radiused plates in place so that they cannot rotate with respect to one another. When cable 68 is engaged such that it pulls the front radiused plate 64 forward and away from the rear radiused plate 62 (as can be seen in FIGS. 4C & 4D), the pins 66 disengage the openings, allowing the radiused plates to rotate in opposite directions from one another in response to a downward pressure placed on the foot pedals (as seen in FIG. 4D). Teetering system further includes a spring 60 that biases the radiused plates to cause them to return to equilibrium (as shown in FIGS. 4A and 4B) so that each of the openings 65 align when a force is not being applied to either of the foot pedals.

If, however, a downward force is placed on the foot pedals when the radiused plates are separated as shown in FIGS. 4C & 4D, the radius plates will rotate in opposite directions, which reduces the vertical distance between the ground and the foot pedals. Once the user has found a comfortable position for the foot pedals, the tension in the cable 68 may be released so that the radiused plates return to their original position where they are generally adjacent to one another (as seen in FIGS. 4A & 4B). Once the radiused plates 62 and 64 return to their original position, the pins 66 re-engage one or more of the openings 65 so that the radiused plates 62 and 64 cannot rotate any further with respect to one another even if a downward force is applied to the foot pedals.

Figures 4E, 4F:
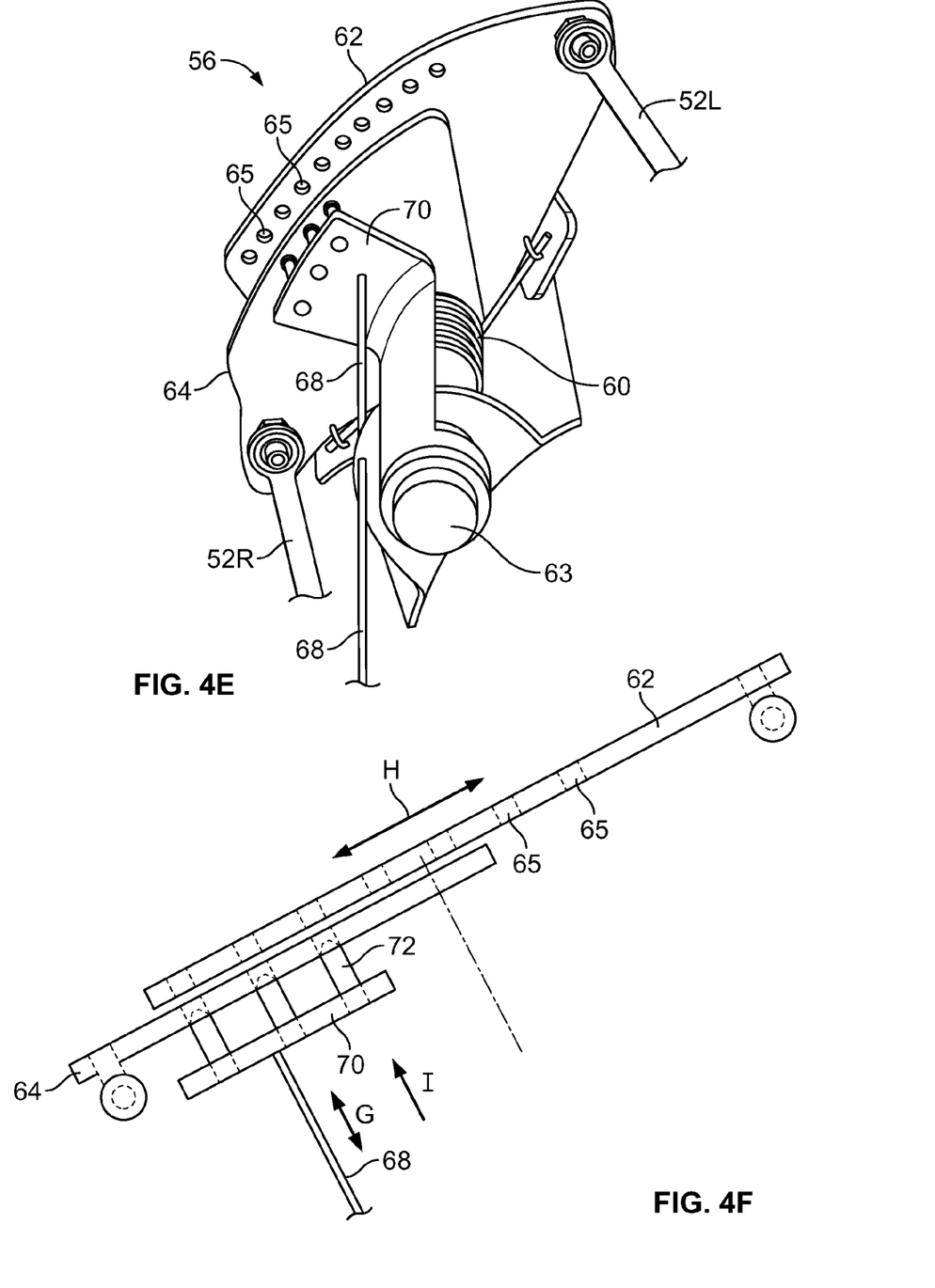

Referring now to FIGS. 4E & 4F, another embodiment of the teeter assembly can be seen. In this embodiment, teeter assembly 50 includes radiused plates 62 and 64 as well as a third smaller radiused plate 70. The smaller radiused plate is mounted on shaft 63 such that it rotates at the same rate as radiused plate 64. In this embodiment, however, radius plates 62 and 64 do not have pins that are disposed within the openings. Instead, pins 72 are disposed in smaller radiused plate 70. Pins 72 are adapted to engage openings 65 disposed in the two larger radiused plates 62, 64. When engaged, pins prevent the two larger radiused plates from rotating with respect to one another and thus keeping the foot pedals in a first location with respect to one another. When the cable 68 is engaged, the smaller radiused plate 70 is caused to move in direction G away from the two larger radiused plates, thus disengaging the pins 72 from the openings 65 disposed in the larger radiused plates 62, 64. Once the pins are disengaged, the radiused plates are allowed to rotate with respect to one another in direction H in response to a downward force placed on the foot pedals. Once the user finds a comfortable foot pedal position, the cable may be disengaged and the smaller radiused plate will move in direction I towards the two larger radiused plates, thus allowing pins 72 to reengage openings 65 in the radiused plates. Once engaged, the teeter assembly 56 will operate normally to ensure that the foot pedals reciprocate in a synchronous manner.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A variable speed drive system for a rider powered personal vehicle comprising:
    a frame having a front wheel and a rear wheel attached to the frame;
    reciprocating pedals rotatably attached to the frame for supporting the rider;
    at least one pedal cam attached to one of the pedals at a hub and carried by the frame where a distance between the hub and a first sprocket tooth of the pedal cam is less than a distance between the hub and a second sprocket tooth of the pedal cam;
    a coupling cam attached at a front axle and operably connected to the pedal cam so that when the pedal cam rotates when force is exerted downward on the pedal, the coupling cam rotates in an opposite direction from the pedal cam;
    a drive sprocket carried by the coupling cam and linked to a wheel sprocket by a drive chain so that when the coupling cam rotates, the drive sprocket rotates causing the rear wheel to rotate; and,
    a cam chain operatively connecting the pedal cam and the coupling cam.

2. The system of claim 1 wherein the pedal cam is aspheric.

3. The system of claim 1 wherein a pedal cam distance defined between the hub of the pedal cam and a point on a perimeter of the pedal cam where the pedal cam contacts the coupling cam is reduced as the pedal cam rotates in a first direction.

4. The system of claim 3 wherein the ratio between the pedal cam distance and a coupling cam distance, defined as the point between the rotational axis of the coupling cam and the point on a perimeter of the coupling cam where the coupling cam contacts the pedal cam increases as the pedal cam rotates in a first direction.

5. The system of claim 4 where the ratio between the pedal cam distance and the coupling cam distance is reduced as the pedal cam rotates in an opposite direction.

6. The system of claim 1 including a pedal cam lip and a coupling cam lip that, at a predetermined rotation path, the pedal cam lip and the coupling cam lip contact preventing further rotation.

7. The system of claim 1 including:
    a left pedal cam and a right pedal cam driven by a left pedal and a right pedal respectively; and,
    a bridge attached between the pedals having a first plate and a second plate having a variable length so that the stroke of the pedals can be varied by varying the length of the bridge to vary the rotational path of the pedal cam.

8. The system of claim 7 wherein the first plate and the second plate are radiused.

9. A variable speed drive system for a rider powered personal vehicle comprising:
    a frame having a front wheel, a rear wheel and reciprocating pedals;
    a pedal cam carried by the pedals so that when the pedal reciprocates, the pedal cam rotates;
    a coupling cam carried by the frame and connected to the rear wheel so that when the pedal cam rotates, the coupling cam rotates thereby causing the rear wheel to rotate;
    a pedal cam distance, defined between a hub of the pedal cam and a point where the pedal cam contacts the coupling cam and a coupling cam distance, defined between an axis of the coupling cam and the point where the coupling cam contacts the pedal cam;
    a cam chain connecting the pedal cam and the coupling cam; and,
    wherein the ratio between the pedal cam distance and the coupling cam distance is reduced as the pedal cam rotates in a first direction.

10. The system of claim 9 including a pedal cam lip and a coupling cam lip that contact preventing over-rotation of the pedal cam.

11. The system of claim 9 wherein the cam chain wraps around the pedal cam more than 360°.

12. The system of claim 9 including a teeter assembly connecting each of the reciprocating pedals including a variable length bridge to vary the pedal stoke according to the length of the bridge.

13. A variable speed drive system for a rider powered personal vehicle comprising:
    a frame having a front wheel, a rear wheel, a left pedal and a right pedal;
    a left and right pedal cam carried by the frame and operatively connected to a left and right coupling cam respectively;
    a drive chain connected to at least one coupling cam and the rear wheel so that when the coupling cam rotates, force is transferred to the rear wheel causing the rear wheel to rotate; and,
    a teeter assembly attached between the left and right pedal having a variable length bridge so that the pedal stroke of at least one pedal can be varied with the length of the bridge allowing the rider to adjust the maximum height of at least one of the pedals at the top of the stroke.

14. The system of claim 13 including a cam chain connecting the pedal cam to the coupling cam.

15. The system of claim 13 including a pedal cam distance, defined between a hub of the pedal cam and a point where the pedal cam contacts the coupling cam and a coupling cam distance, defined between an axis of the coupling cam and the point where the coupling cam contacts the pedal cam; and,
    wherein the ratio between the pedal cam distance and the coupling cam distance is reduced as the pedal cam rotates in a first direction.

16. The system of claim 15 wherein the bridge includes a pair of radiused plates that can be arranged to vary the length of the bridge.

* * * * *